(12) United States Patent
Wiffen et al.

(10) Patent No.: US 11,726,166 B2
(45) Date of Patent: Aug. 15, 2023

(54) DUAL POLAR FULL DUPLEX RADAR TRANSCEIVER

(71) Applicant: Kabushiki Kaisha Toshiba, Tokyo (JP)

(72) Inventors: Alfred Daniel Wiffen, Bristol (GB); Gavin Watkins, Bristol (GB)

(73) Assignee: Kabushiki Kaislia Toshiba, Tokyo (JP)

( * ) Notice: Subject to any disclaimer, the term of this patent is extended or adjusted under 35 U.S.C. 154(b) by 87 days.

(21) Appl. No.: 16/951,327

(22) Filed: Nov. 18, 2020

(65) Prior Publication Data

US 2022/0155408 A1 May 19, 2022

(51) Int. Cl.
- *G01S 7/02* (2006.01)
- *G01S 7/28* (2006.01)
- *G01S 13/95* (2006.01)

(52) U.S. Cl.
CPC .............. *G01S 7/023* (2013.01); *G01S 7/024* (2013.01); *G01S 7/2813* (2013.01); *G01S 13/95* (2013.01)

(58) Field of Classification Search
CPC ....................................................... H04B 7/10
See application file for complete search history.

(56) References Cited

U.S. PATENT DOCUMENTS

| | | | |
|---|---|---|---|
| 7,633,435 B2 | 12/2009 | Meharry et al. | |
| 9,482,752 B1 * | 11/2016 | Ryzhkov | G01S 7/026 |
| 10,218,490 B1 * | 2/2019 | Yang | G01S 7/038 |
| 2009/0086862 A1 * | 4/2009 | Thesling | H04B 7/10 375/346 |
| 2012/0155335 A1 * | 6/2012 | Khojastepour | H01Q 3/2605 370/278 |
| 2017/0104506 A1 * | 4/2017 | Liu | H04B 1/123 |

(Continued)

FOREIGN PATENT DOCUMENTS

| | | |
|---|---|---|
| GB | 2551346 A | 12/2017 |
| JP | 2011-27546 A | 2/2011 |
| JP | 2020-173107 A | 10/2020 |

(Continued)

OTHER PUBLICATIONS

Zhang et al., "Full Duplex 2x2 MIMO Radios", Sixth International Conference on Wireless Communications and Signal Processing (WCSP), 2014, 6 pages.

(Continued)

*Primary Examiner* — Erin F Heard
*Assistant Examiner* — Hailey R Le
(74) *Attorney, Agent, or Firm* — Oblon, McClelland, Maier & Neustadt, L.L.P.

(57) ABSTRACT

A full duplex dual polar radar transceiver comprising a dual polarisation radar antenna, a transmission path, a horizontal polarisation receive path, and a vertical polarisation receive path, a first cancellation path connected between the transmission path and the vertical polarisation receive path, and a second cancellation path connected between the transmission path and the horizontal polarisation receive path. Each cancellation path is configured to vary a transmission signal provided by the transmission path by varying at least one of a phase shift, a delay, or an amplitude so as to cancel self-interference on each of the vertical and horizontal polarisation receive paths.

19 Claims, 5 Drawing Sheets

(56) References Cited

U.S. PATENT DOCUMENTS

2018/0131502 A1* 5/2018 Askar .................... H04B 1/401
2020/0185830 A1* 6/2020 West .................... H01Q 21/062

FOREIGN PATENT DOCUMENTS

WO  WO-2010049922 A1 *  5/2010  .............. H01P 1/213
WO  WO-2019201055 A1 * 10/2019  .............. H04B 1/12

OTHER PUBLICATIONS

Liu et al., "Multi-tap Analog MIMO Self-Interference Cancellation for Full-Duplex Communications", 9$^{th}$ International Conference on Wireless Communications and Signal Processing (WCSP), 2017, 6 pages.

Japanese Office Action dated Mar. 8, 2022 in Japanese Patent Application No. 2021-014875, 4 pages.

* cited by examiner

DUAL POLAR FULL DUPLEX RADAR TRANSCEIVER

FIELD

Embodiments described herein relate generally to Full Duplex (FD) systems for dual polar radar transceivers.

BACKGROUND

Full Duplex (FD) is the simultaneous transmission and reception (STAR) of signals on the same frequency at the same time. Dual polar radar systems, such as weather radar, suffer from self-interference that can saturate receive paths, so that the dual polar radar cannot receive any radar signals until it has finished transmitting the radar transmit signal. This creates a blind region that cannot be imaged without a second radar transmission, and limits the dual polar radar to half duplex operation. There is therefore a need for means of cancelling the self-interference on the receive paths of such dual polar radar systems.

In the following, embodiments will be described with reference to the drawings in which.

DETAILED DESCRIPTION

Figure 1:
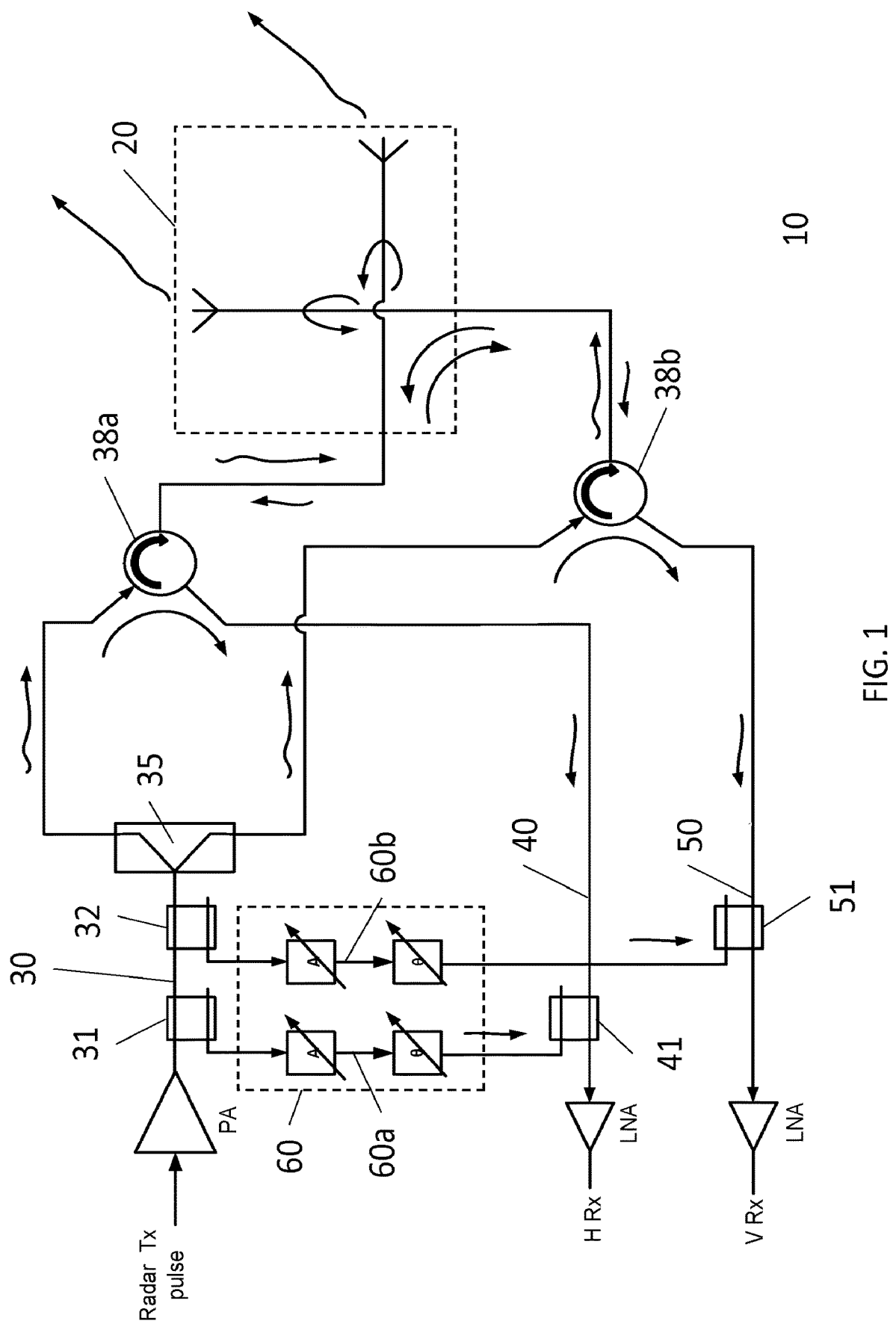
FIG. 1 shows a dual polar transceiver with self-interference cancellation for STAR operation.

According to an embodiment there is provided a full duplex dual polar radar transceiver comprising a dual polarisation radar antenna, a transmission path, a horizontal polarisation receive path, and a vertical polarisation receive path. The dual polar radar transceiver further comprises a first cancellation path connected between the transmission path and the vertical polarisation receive path, and a second cancellation path connected between the transmission path and the horizontal polarisation receive path. Each cancellation path is configured to vary a transmission signal provided by the transmission path by varying at least one of phase shift, delay, or amplitude so as to cancel self-interference on each of the vertical and horizontal polarisation receive paths.

The dual polarisation radar antenna may comprise two orthogonal antennae for transmission and receipt of signals.

In an embodiment the first and second cancellation paths each comprises a variable phase shift element and a variable amplitude element connected in series.

The variable amplitude element on each of the first and second cancellation paths may vary the gain or the attenuation of a signal. Likewise, the variable phase shift element on each of the first and second cancellation paths may vary the phase of a signal.

In an embodiment the first and second cancellation paths each comprises a tuneable delay line and a variable amplitude element connected in series.

In an embodiment the full duplex dual polar radar transceiver further comprises a first coupler connected to a horizontal polarisation antenna of the dual polarisation radar antenna and having an output port connected to the horizontal polarisation receive path. A second coupler is connected to a vertical polarisation antenna of the dual polarisation radar antenna and has an output port connected to the vertical polarisation receive path. An RF power splitter is connected to input ports of each of the first and second couplers and is configured to receive a transmission signal from the transmission path. Each of the first and second cancellation paths are connected between to the input of the RF power splitter and to a respective one each of the horizontal and vertical receive paths.

In an embodiment the full duplex dual polar radar transceiver further comprises a first coupler connected to a horizontal polarisation antenna of the dual polarisation radar antenna and having an output port connected to the horizontal polarisation receive path. A second coupler is connected to a vertical polarisation antenna of the dual polarisation radar antenna and has an output port connected to the vertical polarisation receive path. An RF power splitter comprising two outputs is configured to receive a transmission signal from the transmission path, wherein the respective outputs are each connected to respective input ports of the first and second couplers. Each of the first and second cancellation paths is connected to respective outputs of the RF power splitter and to a respective one of the horizontal and vertical receive paths.

In an embodiment the full duplex dual polar radar transceiver further comprises a first coupler connected to a horizontal polarisation antenna of the dual polarisation radar antenna and having an output port connected to the horizontal polarisation receive path. A second coupler is connected to a vertical polarisation antenna of the dual polarisation radar antenna and has an output port connected to the vertical polarisation receive path. An RF power splitter comprising two outputs is configured to receive a transmission signal from the transmission path, wherein the respective outputs are each connected via a power amplifier to a respective input port of the first and second couplers. Each of the first and second cancellation paths is connected to respective outputs of the power amplifiers and to a respective one of the horizontal and vertical receive paths.

Each of the first and second couplers may be implemented as any one of a circulator, a hybrid coupler, or a rat-race combiner.

Each of the first and second couplers may be configured to couple each of the input port and the output port to the respective horizontal or vertical polarisation antenna, and to isolate the input and outputs from each other.

In an embodiment the horizontal polarisation receive path and vertical polarisation receive path each include a low noise amplifier, and the first and second cancellation paths are connected to the input of the low noise amplifier on each of the respective vertical polarisation receive path and horizontal polarisation receive path.

In an embodiment the transmission signal is dynamically varied by the first and second cancellation paths using an automated adaptive tuning procedure.

The automated adaptive tuning procedure may be controlled by a controller or on-line.

In an embodiment the first cancellation path is connected to the transmission path by a single tap and is connected to the vertical polarisation receive path by a single tap, and the second cancellation path is connected to the transmission path by a single tap and is connected to the horizontal polarisation receive path by a single tap.

According to an embodiment there is provided a weather radar comprising the full duplex dual polar radar transceiver as described above.

According to an embodiment there is provided a method of self-interference cancellation for a full duplex dual polar radar transceiver, the method comprising generating a transmission signal, creating a modified transmission signal for each of two cancellation paths by modifying at least one of amplitude, delay, or phase of the transmission signal on each of the two cancellation paths, creating respective interference reduced receive signals by applying the respective modified transmission signals from each of the two cancellation paths to a corresponding horizontal polarisation receive path and vertical polarisation receive path so as to cancel self-interference on each of the vertical and horizontal polarisation receive paths.

In an embodiment the modified transmission signals are applied to the corresponding vertical and horizontal polarisation receive paths prior to a low noise amplifier located on each of the vertical and horizontal polarisation receive paths.

In an embodiment the transmission signal is dynamically modified on each of the two cancellation paths using automated adaptive tuning.

According to an embodiment there is provided a method of atmospheric imaging using a full duplex dual polar radar transceiver comprising using a method of self-interference cancellation as described above, and detecting said interference reduced receive signals whilst transmitting signals for atmospheric imaging using antennae connected to the full duplex dual polar radar transceiver.

The use of two orthogonal transmit Tx and receive Rx polarisation states in a pulse compression PC weather radar enables improved precipitation classification and clutter rejection. Here, a modulated radar signal (e.g. a chirp) is transmitted simultaneously in both horizontal and vertical polarisation states, and the resulting radar return signal then received on both horizontal and vertical polarisations.

However, known systems may encounter self-interference between the transmit and receive paths, where such self-interference may be caused by leakage due to imperfect port isolation in the coupler (e.g. −20 dB leakage) and antenna impedance mismatch (e.g. −20 dB), and leakage due to coupling between the ports of the antenna (e.g. −25 dB). The self-interference leakage into both paths during radar signal transmission has sufficient power that the low noise amplifiers (LNAs) on the receive paths become saturated, distorting the received signal and making any recovery of the reflected radar signals received during the transmission period practically impossible. This results in the creation of a blind region corresponding to the length of the pulsed radar transmission, since the radar cannot detect the radar signals received whilst it is transmitting due to the self-interference, so that reflections from objects near to the radar cannot be detected. In order to image the resulting blind region, it is common to then include a second set of radar transmissions operating with a shorter pulse, transmitted either at a different time or on a different carrier frequency. This increases either the time taken to capture a full image or the operating bandwidth of the system.

FIG. 1 shows a full duplex (FD) dual polar transceiver with self-interference cancellation for simultaneous transmission and reception (STAR) operation according to an embodiment. This dual polar transceiver architecture enables radar signals to be simultaneously transmitted and received on the same frequency channel (STAR) by the application of full duplex self-interference cancellation (SiC) technology. This eliminates the blind region and the need for a second radar transmission using a shorter pulse.

The full-duplex dual polar transceiver includes an RF coupling, or cancellation path, between the transmit path and each receive path, such that the coupled signals at least partially cancel out the self-interference caused by leakage. Each cancellation path contains tuneable elements that allow the phase, delay, or amplitude of the coupled signal to be adjusted such that maximum self-interference cancellation SiC is achieved.

The embodiment of FIG. 1 shows the dual polar transceiver 10, which comprises a dual polarisation radar antenna 20, a transmission path 30, a horizontal polarisation receive path 40, and a vertical polarisation receive path 50. The dual polarisation radar antenna 20 may comprise two orthogonal antennae for transmission and receipt of signals. The transmission path 30 is configured to supply a transmission signal Tx, which may be in the form of a pulse, to the dual polarisation radar antenna 20. The horizontal polarisation receive path 40 is configured to receive a horizontal polarisation receive signal HRx from the dual polarisation radar antenna 20. Likewise, the vertical polarisation receive path 50 is configured to receive a vertical polarisation receive signal VRx from the dual polarisation radar antenna 20.

The transmission signal Tx is amplified (for example using a power amplifier PA) and then split, for example using an RF power splitter 35, between the horizontal and vertical polarisation ports of the dual polarisation radar antenna 20. To enable the dual polarisation radar antenna 20 to be used for both transmission and reception, the transmission signals Tx are connected to the dual polarisation radar antenna 20 via couplers such as circulators 38a and 38b. The couplers of FIG. 1 are implemented as circulators 38a and 38b, but these may be alternatively replaced with, for example, hybrid couplers or rat-race combiners. The circulators 38a and 38b (ideally) separate the transmission signals Tx going into the horizontal and vertical polarisation ports of the dual polarisation radar antenna 20 from the received horizontal and vertical polarisation receive signals HRx and VRx coming out. That is to say, each of the circulators 38a and 38b is configured to couple an input port (connected to the transmission path 30) of the circulator to a corresponding port of the dual polarisation antenna 20. Likewise, each of the circulators 38a and 38b is configured to couple an output port (connected to one of the horizontal or vertical polarisation receive paths 40 or 50) of the circulator to that corresponding port of the dual polarisation antenna 20. In this regard, each circulator is ideally configured to isolate the input and output ports from each other to reduce interference between signals for transmission by the dual polarisation antenna 20 and signals received by the dual polarisation antenna 20.

As can be observed by the arrows in FIG. 1, the transmission signal Tx may be reflected at the dual polarisation radar antenna 20, causing self-interference on each of the horizontal and vertical polarisation receive paths 40 and 50. In addition, imperfect isolation between the input and output ports of the circulators 38a and 38b may lead to leakage of the transmission signal Tx into the horizontal and vertical polarisation receive paths 40 and 50, resulting in a further source of self-interference on each of the horizontal and vertical polarisation receive paths 40 and 50.

The dual polar transceiver 10 includes a cancellation path 60 between the transmission path 30 and the horizontal and vertical receive paths 40 and 50 for each polarisation.

The cancellation path 60 may be connected to the transmission path 30 between the power amplifier PA and the RF power splitter 35, and connected to the horizontal and vertical receive paths 40 and 50 prior to the low noise amplifiers LNA on each receive path.

It will be appreciated that alternative arrangements of the dual polar transceiver 10 to that shown in FIG. 1 are also possible.

Figure 2:
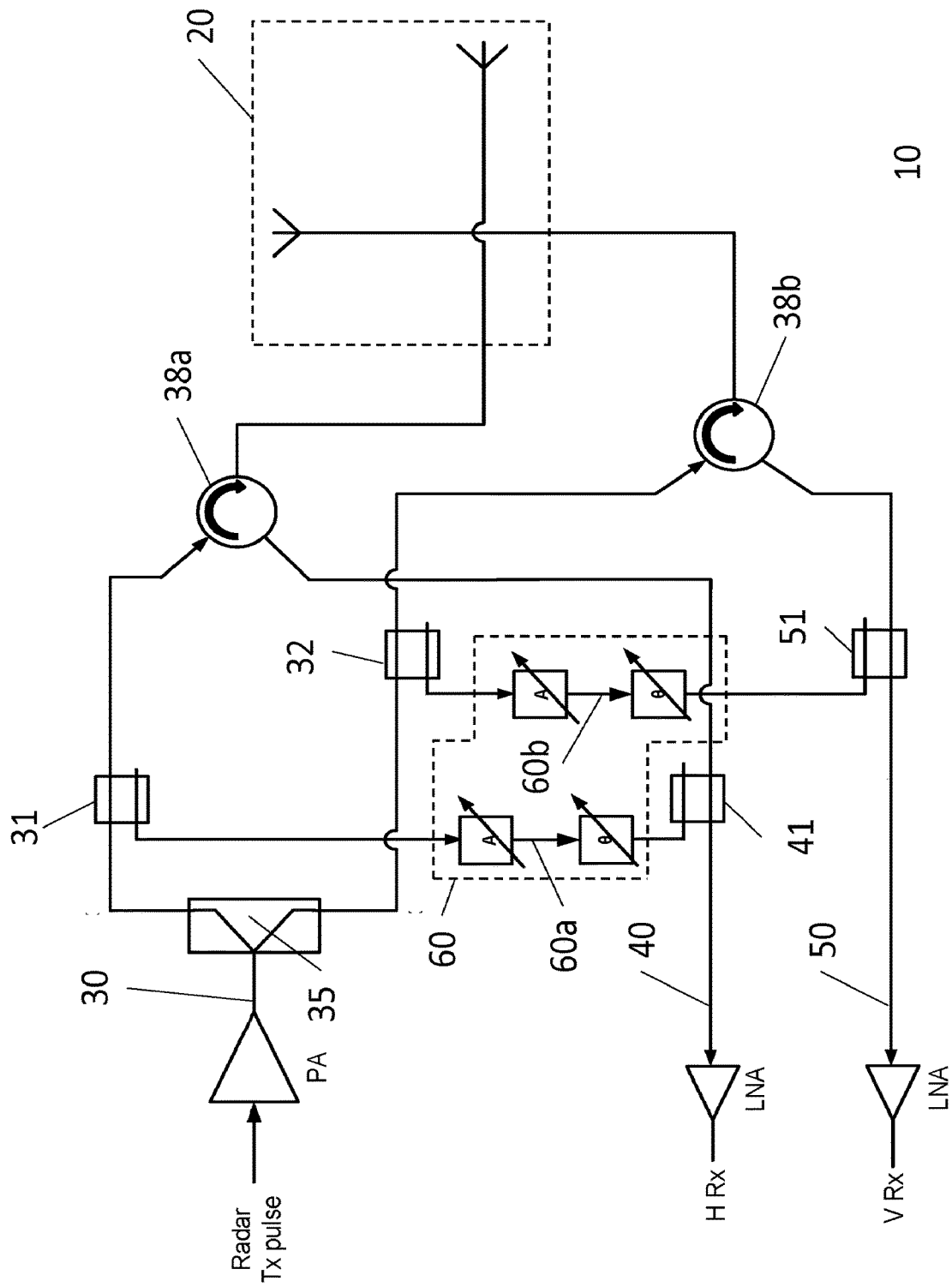
FIG. 2 shows an alternative arrangement of a dual polar transceiver with self-interference cancellation for STAR operation.

For instance, FIG. 2 shows the cancellation path 60 being connected to each channel of the transmission path 30 between the output of the RF power splitter 35 and the input ports of the circulators 38*a* and 38*b*, and connected to each of the horizontal and vertical receive paths 40 and 50 prior to the low noise amplifiers LNA on each of the horizontal and vertical polarisation receive paths 40 and 50. In all other respects, the arrangement of FIG. 2 is the same as the arrangement shown in FIG. 1.

Figure 3:
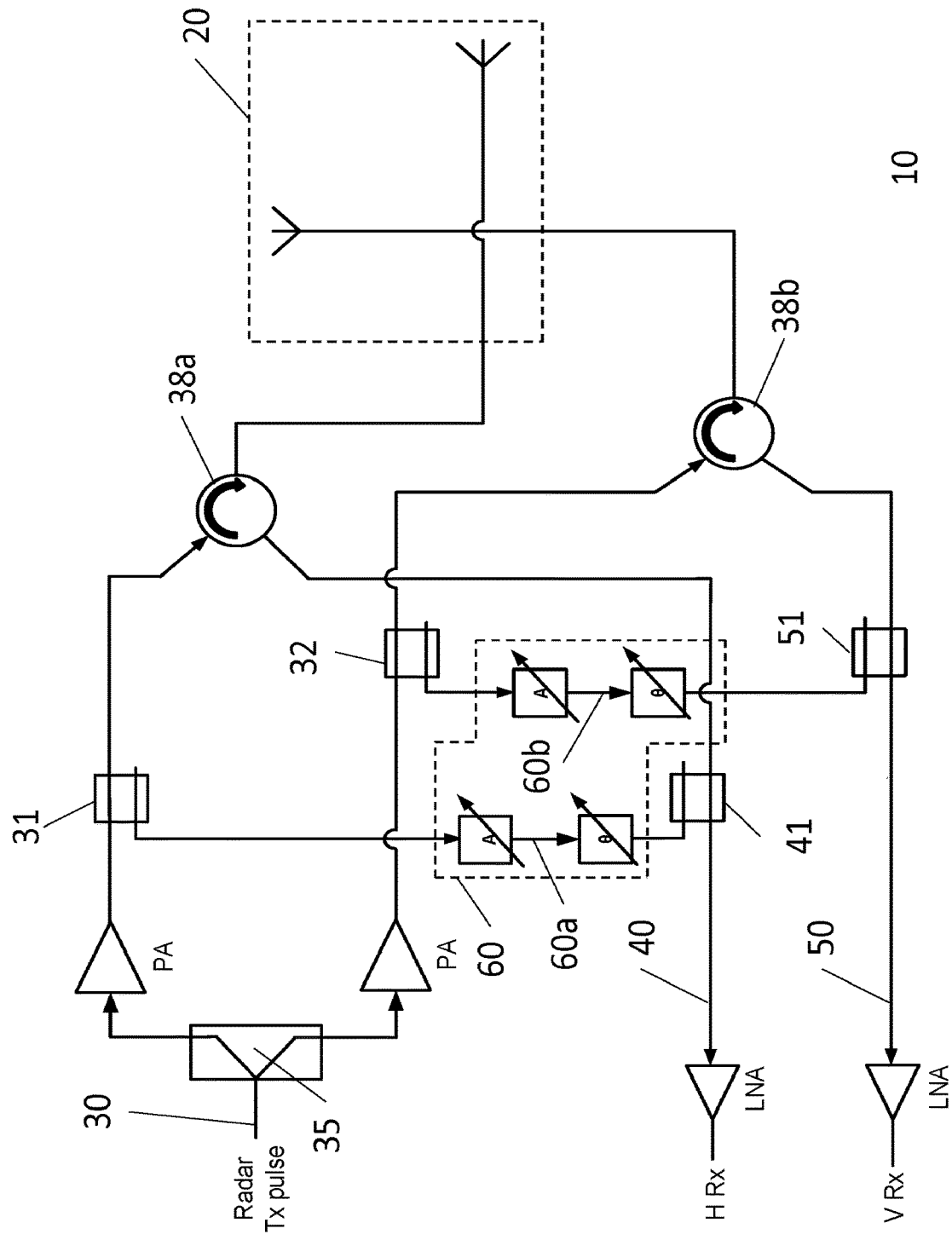
FIG. 3 shows a further alternative arrangement of a dual polar transceiver with self-interference cancellation for STAR operation.

A further alternative arrangement is shown in FIG. 3, in which two power amplifiers PA are included, each being connected between an output of the power splitter 35 and an input port of one of the circulators 38*a* and 38*b*. This results in the transmit signal Tx passing through the power splitter 35 before passing through the power amplifier PA on each channel of the transmission path 30. Here, the cancellation path 60 is connected to each channel of the transmission path 30 between the output of the power amplifiers PA and the input ports of the circulators 38*a* and 38*b*. As in other embodiments, the cancellation path 60 is connected to each of the horizontal and vertical receive paths 40 and 50 prior to the low noise amplifiers LNA on each of the horizontal and vertical polarisation receive paths 40 and 50. In all other respects, the arrangement of FIG. 3 is the same as the arrangement shown in FIG. 1.

By performing self-interference cancellation SiC prior to the low noise amplifiers LNA of the horizontal and vertical receive paths 40 and 50, the dynamic range requirements of the low noise amplifiers LNA are reduced compared with a case where self-interference cancellation is performed after the low noise amplifiers LNA.

The cancellation path 60 of the embodiments of FIG. 1, FIG. 2, and FIG. 3 include a first cancellation path 60*a* which connects the transmission path 30 to the horizontal polarisation receive path 40, and a second cancellation path 60*b* which connects the transmission path 30 to the vertical polarisation receive path 50.

The first cancellation path 60*a* may be connected at a first end to the transmission path 30 by one or more taps 31 (where a tap is, for instance, a directional coupler), and connected at a second end to the horizontal receive path 40 by another one or more taps 41. Likewise, the second cancellation path 60*b* may be connected at a first end to the transmission path 30 by one or more taps 32, and connected at a second end to the vertical receive path 50 by another one or more taps 51.

The cancellation path 60 of the dual polar transceiver 10 may implement only a single tap 31, 32, 41 and 51 connecting the each end of each cancellation path. The use of a single tap may be sufficient to achieve cancellation over the bandwidth used by the particular radar system in question (such as dual polar radar systems), but additional taps may be required where larger operating bandwidths are used.

Each of the first and second cancellation paths 60*a* and 60*b* may comprise tuneable components that allow for the variation of amplitude (gain or attenuation) A, and the variation of phase shift θ. The amplitude (gain or attenuation) A and the phase shift θ may then be adapted such that the signal at the output of the cancellation path (at least approximately) cancels out the self-interference leakage of the transmission signal Tx into the relevant receive path at the desired centre frequency For example, the transmission signal Tx is provided to each of the first and second cancellation paths 60*a* and 60*b* after exiting the power amplifier(s) PA (and, in the embodiment of FIG. 2, also after exiting the power slitter 35) via taps 31 and 32. The tuneable components of each cancellation path then vary the amplitude A (i.e. gain or attenuation) and the phase shift θ of the transmission signal Tx to form a signal that is the inverse of the transmission signal Tx (and source of the self-interference on the horizontal and vertical polarisation receive paths 40 and 50). The cancellation paths 60*a* and 60*b* then each provide an inverse signal to the respective horizontal and vertical polarisation receive paths 40 and 50 via the taps 41 and 51, cancelling out the self-interference leakage present on each of the receive paths 40 and 50. The varied signal is then provided to the relevant receive path 40 or 50 and cancels out the self-interference leakage, thereby reducing or eliminating the blind region and allowing for full duplex simultaneous transmission and reception (STAR) operation.

As a result, the arrangement of each of FIG. 1, FIG. 2, and FIG. 3 is able to (at least partially) cancel the self-interference leakage in the receive paths for two different polarisation states.

The tuneable phase shift θ may be replaced with a tuneable delay line D to achieve the same effect. Alternatively, a tuneable delay line D (or variable delay element) may be included in the first and second cancellation paths 60*a* and 60*b* in addition to a tuneable phase shift θ. Each of the first and second cancellation paths 60*a* and 60*b* may therefore include a transmission line with a variable delay element.

The dual polar transceiver 10 shown in each of FIG. 1, FIG. 2, and FIG. 3 is configured such that only a single source of self-interference must be cancelled, compared with multiple-in, multiple-out (MIMO) systems where self-interference from multiple transmission signal Tx sources need to be cancelled in each receive path. This reduces the amount of hardware required for self-interference cancellation.

In present embodiments, a cancellation system is used to suppress any self-interference presented to the input of the low noise amplifier LNA. This is done by generating a cancellation signal that is the inverse of the self-interfering transmission signal.

The cancellation system described herein may be applied to a pulse compression weather radar system, where such pulse compression weather radar systems implement a modulated, or chirped, pulse as a transmission signal transmitted simultaneously in both horizontal and vertical polarisation states.

Figure 4:
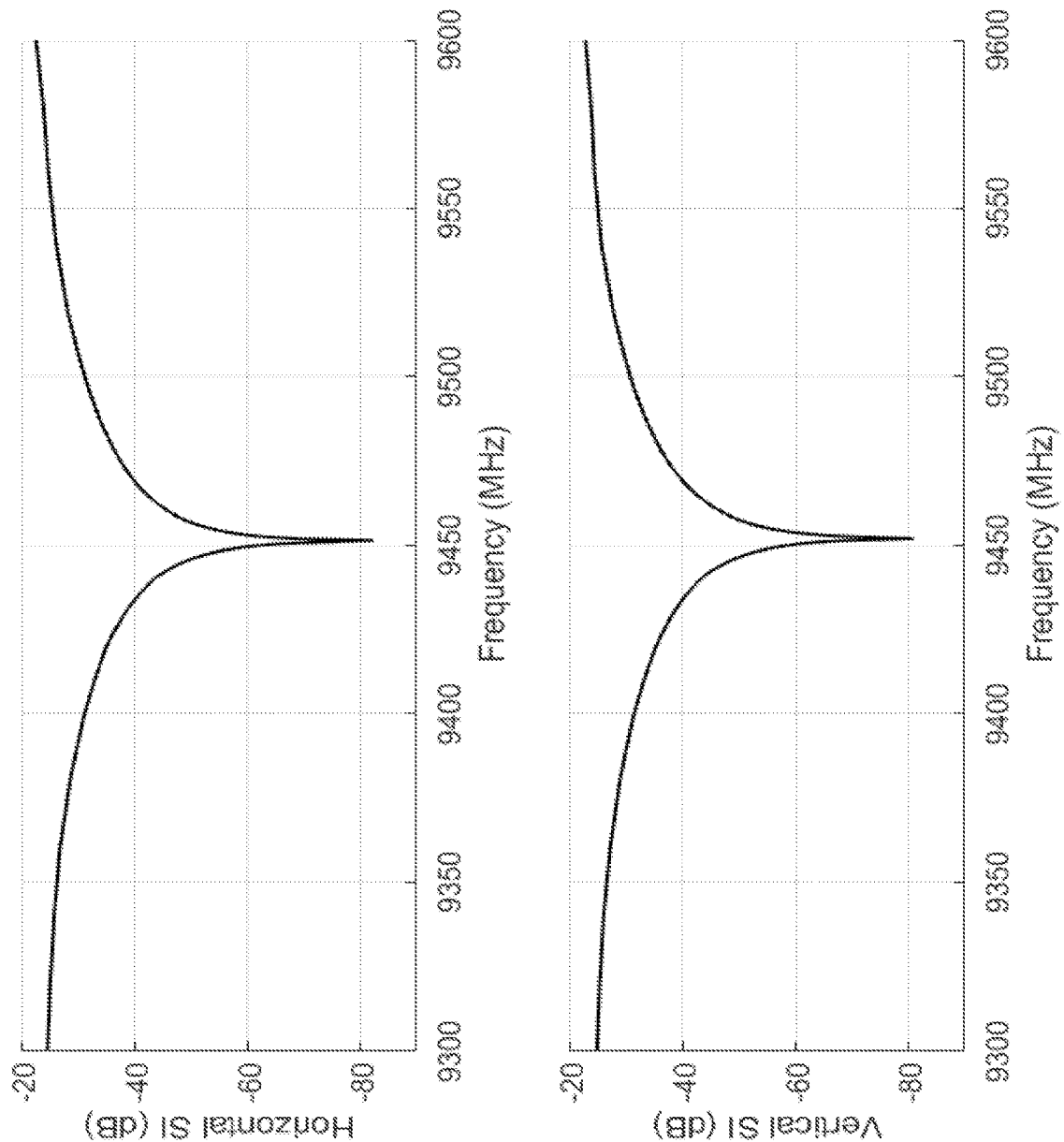
FIG. 4 shows self-interference frequency response with self-interference cancellation for horizontal and vertical polarisations at an operating frequency of 9.451 GHz.

FIG. 4 shows the simulated self-interference level achieved by any one of the arrangement of FIG. 1, FIG. 2, and FIG. 3 tuned to provide cancellation at a centre frequency of 9.451 GHz, and shows measured antenna responses for a horn antenna. Both horizontal and vertical self-interference curves are shown in FIG. 4. As can be observed, the self-interference level outside of the operating band, for example at 9.3 GHz and 9.6 GHz, is between 20 dB and 30 dB below the transmit power for each of the horizontal and vertical polarisation receive paths 40 and 50. By comparison, in the operating band around 9.451 GHz, the dual polar transceiver 10 is able to suppress all self-interference leakage to at least −50 dB below the transmit power over a 10 MHz bandwidth, and at least −60 dB over a 2 MHz bandwidth. Therefore, 30 to 40 dB of self-interference cancellation in the operating band around 9.451 GHz is achieved, thereby removing the blind region and allowing the dual polar transceiver to operate in full duplex mode.

The self-interference cancellation shown in FIG. 4 is tuned to provide cancellation at a centre frequency of 9.451 GHz. However, embodiments are not limited thereto, and cancellation may be scaled to other frequencies operated by dual polar transceivers (for example, for weather radar systems).

Figure 5:
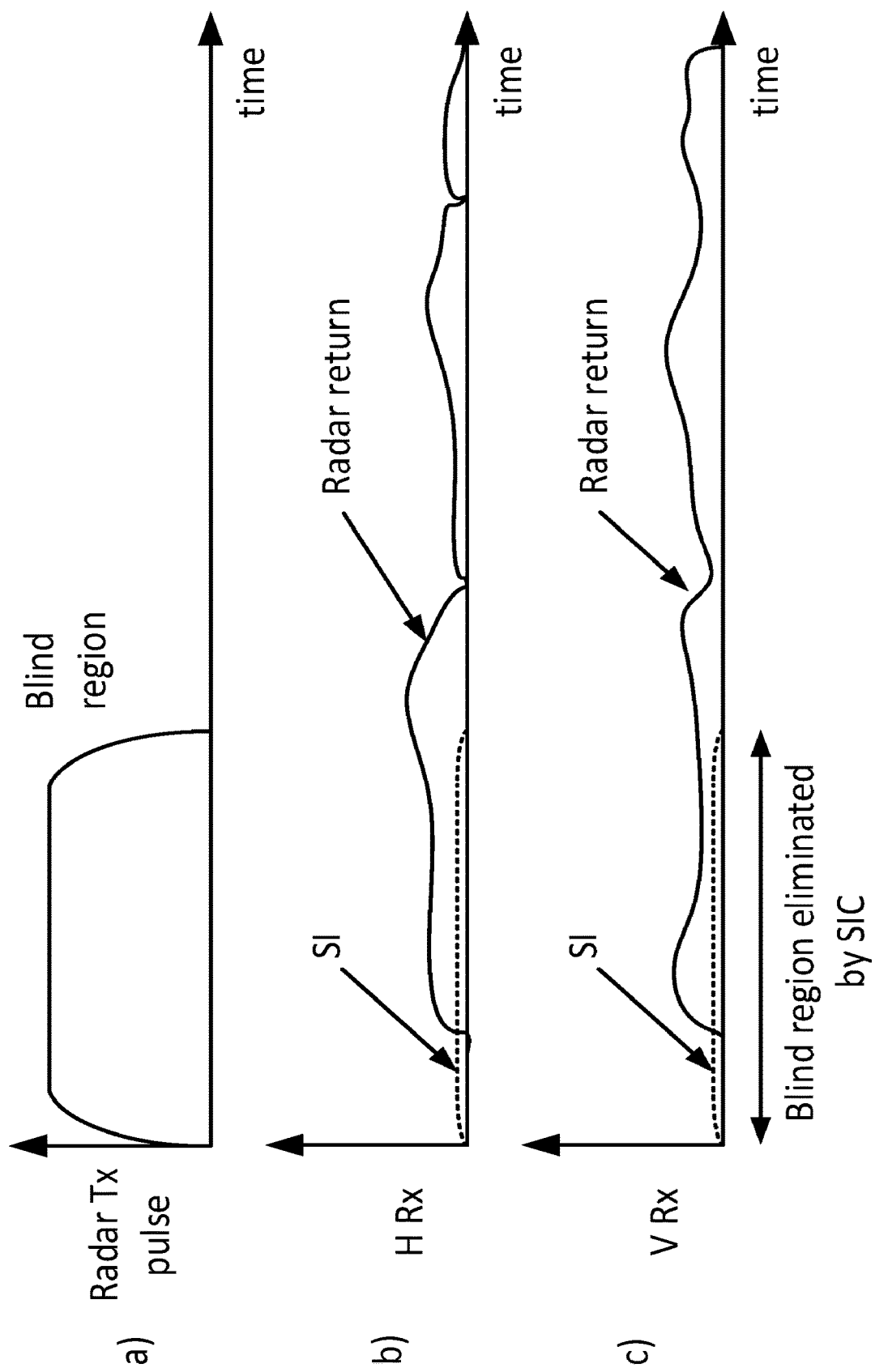
FIG. 5 shows an illustration of a) the blind region formed by self-interference, and the horizontal b) and vertical c) polarisation receive signals after self-interference cancellation.

FIG. 5 shows the elimination of the blind region caused by self-interference achieved by the full-duplex dual polar transceiver 10, where graph a) shows the blind region caused by self-interference from the transmission signal Tx. Graph b) and c) respectively show the horizontal polarisation receive signal HRx from the dual polarisation radar antenna 20 and the vertical polarisation receive signal VRx from the dual polarisation radar antenna 20. Due to the self-interference cancellation SiC suppressing or eliminating the blind region, the radar return on each of the polarisation receive paths are detected, where without self-interference cancellation SiC the radar return would be saturated in the blind region. The dual polar transceiver 10 is then able to achieve full duplex simultaneous transmission and reception (STAR), and can image all distances with a single transmission. The application of full duplex operation removes the need for a second transmission to image the blind region, either reducing bandwidth requirements or imaging time.

To ensure sufficient self-interference cancellation SiC is achieved for simultaneous transmission and reception (STAR), periodic tuning of the variable phase shifter θ and amplitude A (i.e. gain or attenuation) during operation to adapt to any changes in self-interference leakage may be implemented. This may be performed manually or this may be performed dynamically, for instance by a controller or on-line using an automated adaptive tuning procedure. Since only a single variable phase shift element A and variable amplitude element A (i.e. gain or attenuation) must be tuned for each polarisation, this adaptive tuning can be carried out easily and quickly compared with more complex systems, for instance in MIMO transceivers.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A transceiver comprising an antenna, a transmission path, a first polarisation receive path, and a second polarisation receive path,
   wherein the transceiver further comprises
   a first cancellation path connected between the transmission path and the first polarisation receive path; and
   a second cancellation path connected between the transmission path and the second polarisation receive path;
   the first cancellation path being configured to vary a first transmission signal provided by the transmission path by varying at least one of phase shift, delay, or amplitude as self-interference on the first polarisation receive path is reduced, and provide the varied first transmission signal in the first cancellation path to the first polarisation receive path, the self-interference on the first polarisation receive path being due to the first transmission signal, a frequency channel of the first transmission signal being a same as a first frequency channel of a first receive signal on the first polarisation receive path,
   the second cancellation path being configured to vary a second transmission signal provided by the transmission path by varying at least one of phase shift, delay, or amplitude as self-interference on the second polarisation receive path is reduced, and provide the varied second transmission signal in the second cancellation path to the second polarisation receive path, the self-interference on the second polarisation receive path being due to the second transmission signal, a frequency channel of the second transmission signal being a same as a second frequency channel of a second receive signal on the second polarisation receive path, the first frequency channel of the first receive signal being a same as the second frequency channel of the second receive signal, and
   the transceiver being configured to simultaneously transmit and receive signals on a same frequency channel at a same time.

2. The transceiver according to claim 1, wherein the first cancellation path and the second cancellation path each comprises a variable phase shift element and a variable amplitude element connected in series.

3. The transceiver according to claim 1, wherein the first cancellation path and the second cancellation path each comprises a tuneable delay line and a variable amplitude element connected in series.

4. The transceiver according to claim 1, further comprising:
   a first coupler connected to a second polarisation antenna of the antenna and having an output port connected to the second polarisation receive path;
   a second coupler connected to a first polarisation antenna of the antenna and having an output port connected to the first polarisation receive path; and
   a splitter connected to input ports of each of the first coupler and the second coupler and configured to receive the first transmission signal and the second transmission signal from the transmission path;
   wherein each of the first cancellation path d the second cancellation path is connected to the input of the splitter and connected to a respective one of the first polarisation receive path and the second polarisation receive path.

5. The transceiver according to claim 1, further comprising:
   a first coupler connected to a second polarisation antenna of the antenna and having an output port connected to the second polarisation receive path;
   a second coupler connected to a first polarisation antenna of the antenna and having an output port connected to the first polarisation receive path; and
   a splitter comprising two outputs and configured to receive the first transmission signal and the second transmission signal from the transmission path, wherein the respective outputs are each connected to respective input ports of the first coupler and the second coupler;

wherein each of the first cancellation path and the second cancellation path is connected to respective outputs of the splitter and connected to a respective one of the first polarisation receive path and the second polarisation receive path.

6. The transceiver according to claim 1, further comprising:
a first coupler connected to a second polarisation antenna of the antenna and having an output port connected to the second polarisation receive path;
a second coupler connected to a first polarisation antenna of the antenna and having an output port connected to the first polarisation receive path; and
a splitter comprising two outputs and configured to receive the first transmission signal and the second transmission signal from the transmission path, wherein the respective outputs are each connected via a power amplifier to a respective input port of the first coupler and the second coupler;
wherein each of the first cancellation path and the second cancellation path is connected to respective outputs of the power amplifiers and connected to a respective one of the first polarisation receive path and the second polarisation receive path.

7. The transceiver according to claim 1, wherein the first polarisation receive path and the second polarisation receive path each include an amplifier, and
wherein the first cancellation path and the second cancellation path are connected to the input of the amplifier on each of the first polarisation receive path and the second polarisation receive path.

8. The transceiver according to claim 1, wherein the first transmission signal or the second transmission signal is varied by the first cancellation path and the second cancellation path using an automated adaptive tuning procedure.

9. The transceiver according to claim 1,
wherein the first cancellation path is connected to the transmission path by a first single tap and is connected to the first polarisation receive path by a second single tap,
wherein the second cancellation path is connected to the transmission path by a third single tap and is connected to the second polarisation receive path by a fourth single tap, and
wherein the first single tap and the second single tap connect both ends of the first cancellation path, and the third single tap and the fourth single tap connect both ends of the second cancellation path.

10. A weather radar comprising the transceiver according to claim 1.

11. The transceiver according to claim 1, wherein the transceiver detects a self-interference reduced first receive signal and a self-interference reduced second receive signal whilst transmitting signals for atmospheric imaging using the antenna connected to the transceiver.

12. The transceiver according to claim 1, wherein the first polarisation and the second polarisation are orthogonal to each other.

13. The transceiver according to claim 1, wherein the transmission path, the first cancellation path, and the second cancellation path are different from each other.

14. A method of self-interference reduction for a transceiver, the method comprising:
generating a first transmission signal and a second transmission signal;
varying, in a first cancellation path, the first transmission signal provided by a transmission path by varying at least one of phase shift, delay, or amplitude as first self-interference on a first polarisation receive path is reduced, the first self-interference being due to the first transmission signal, a frequency channel of the first transmission signal being a same as a first frequency channel of a first receive signal on the first polarisation receive path, the first cancellation path being connected between the transmission path and the first polarisation receive path, the first cancellation path being included in the transceiver;
providing the varied first transmission signal in the first cancellation path to the first polarisation receive path;
varying, in a second cancellation path, the second transmission signal provided by a transmission path by varying at least one of phase shift, delay, or amplitude as second self-interference on a second polarisation receive path is reduced, the second self-interference being due to the second transmission signal a frequency channel of the second transmission signal being a same as a second frequency channel of a second receive signal on the second polarisation receive path, the second cancellation path being connected between the transmission path and the second polarisation receive path, the second cancellation path being included in the transceiver; and
providing the varied second transmission signal in the second cancellation path second polarisation receive path, wherein
simultaneously transmitted and received signals by the transceiver are on a same frequency channel at a same time, and
the first frequency channel of the first receive signal is a same as the second frequency channel of the second receive signal at the same time.

15. The method according to claim 14, wherein the varied transmission signals are applied to Raid corresponding first polarisation receive path and second polarisation receive path prior to an amplifier located on each of the first polarisation receive path and the second polarisation receive path.

16. The method according to claim 14, wherein the first transmission signal and the second transmission signal are varied on the first cancellation path and the second cancellation path using an automated adaptive tuning procedure.

17. A method of atmospheric imaging using a transceiver comprising:
using the method according to claim 14, and
detecting a self-interference reduced first receive signal and a self-interference reduced second receive signal whilst transmitting signals for atmospheric imaging using an antenna connected to the transceiver.

18. The method according to claim 14, further comprising:
creating an interference reduced first receive signal by applying the varied first transmission signal from the first cancellation path as the first self-interference on the first polarisation receive path is reduced; and
creating an interference reduced second receive signal by applying the varied second transmission signal from the second cancellation path as the second self-interference on the second polarisation receive path is reduced.

19. The method according to claim 14, wherein the first polarisation and the second polarisation are orthogonal to each other.

* * * * *